Feb. 18, 1941. C. C. AHLES Re. 21,715

ROAD GUARD

Original Filed July 8, 1935 3 Sheets-Sheet 1

Inventor:
CARL C. AHLES,
by: Usina & Lauber
his Attorneys.

Feb. 18, 1941. C. C. AHLES Re. 21,715

ROAD GUARD

Original Filed July 8, 1935 3 Sheets-Sheet 2

Inventor:
CARL C. AHLES,
by: Usina & Rauber
his Attorneys.

Feb. 18, 1941. C. C. AHLES Re. 21,715

ROAD GUARD

Original Filed July 8, 1935 3 Sheets-Sheet 3.

Inventor:
CARL C. AHLES,
by: Usina & Rauter
his Attorneys.

Reissued Feb. 18, 1941

Re. 21,715

UNITED STATES PATENT OFFICE 21,715

ROAD GUARD

Carl C. Ahles, Albany, N. Y.

Original No. 2,204,556, dated June 18, 1940, Serial No. 30,374, July 8, 1935. Application for reissue November 13, 1940, Serial No. 365,398

16 Claims. (Cl. 256—13.1)

This invention relates to road guards.

Referring to the accompanying drawings.

Figure 1:
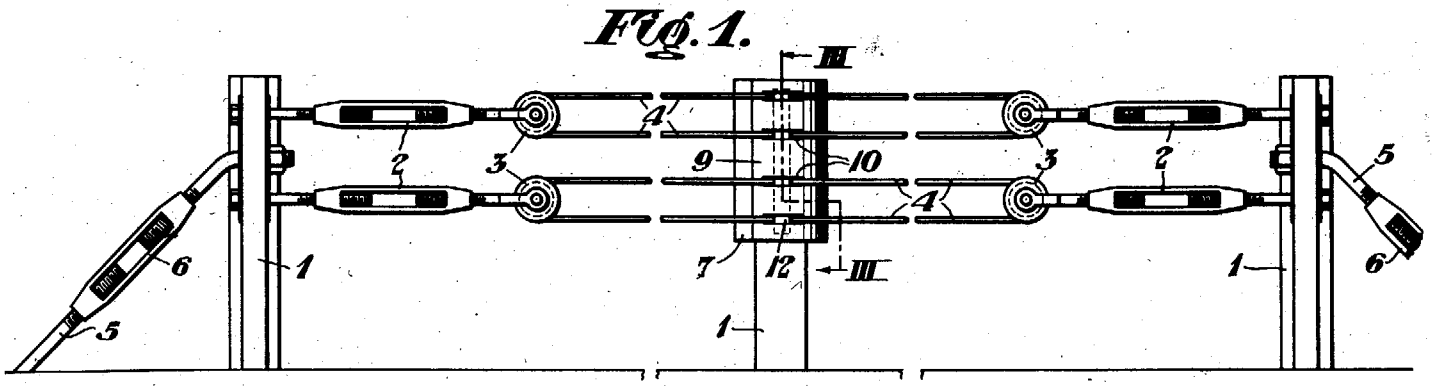
Figure 1 is a broken and compacted side view of the preferred form of the invention.
Figure 3:
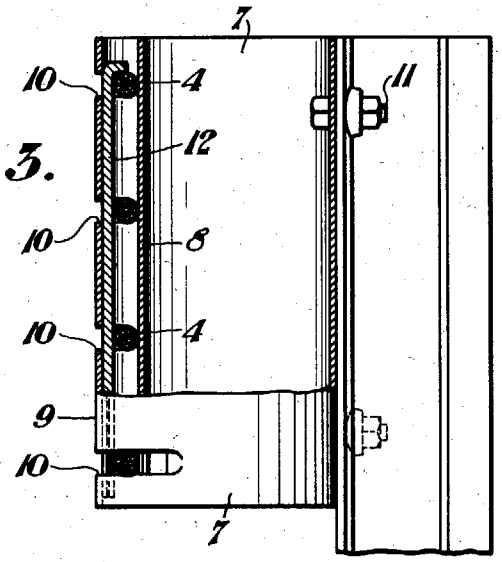
Figure 3 is a sectional view taken from the line III—III in Figure 1.
Figure 2:
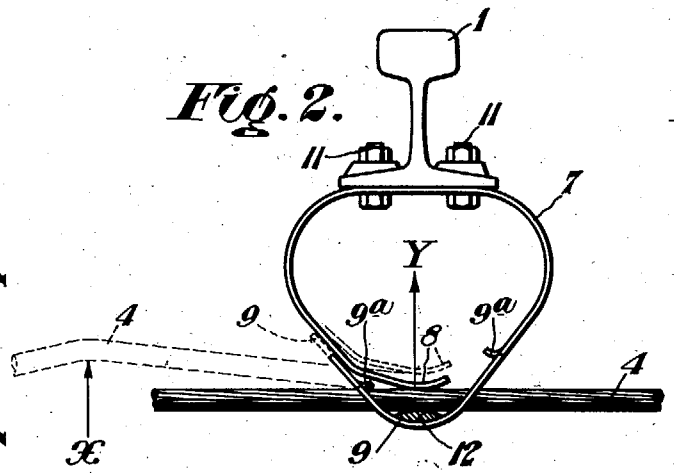
Figure 2 is an enlarged top view of this preferred form.

More specifically, Figures 1 through 3 show a road guard which includes a series of upstanding posts 1. The end ones of these posts mount turnbuckles 2 which carry sheaves 3 around which endless wire ropes 4 are bent. These wire ropes extend transversely past all of the posts excepting the end ones, and the latter are braced against the pull of these ropes by means of anchorage bars 5 which connect with turnbuckles 6. The functions of these various turnbuckles are apparent.

Furthermore, each of the posts 1 between the end posts are provided with brackets which support the wire ropes or cables 4 at successive points in their length.

The bracket illustrated in Figures 1, 2 and 3 consists of a piece of flat spring metal 7 in the form of a loop with its free ends 8 and 9 overlapping, the outer end portion 9 having a series of parallel longitudinal slots 10 extending backward from a line near the free edge in a circumferential direction to a distance sufficient to permit the free play of the cables therein. The ears 9a are bent in at the ends of the slots to provide bearing surfaces for the cables. When the cable bears inwardly (toward the post) against either or both of these ears, it will press them and the corresponding portion of the loop inward while sliding freely thereon.

The bracket is fastened to the post as its inner central portion by bolts 11. The cables 4 in the slots 10 bear also against the inner end 8 of the inner portion of the bracket. A pin 12 passes between the cables and the outer end portion 9 of the bracket so as to hold the cables firmly against the inner end portion 8.

When a car strikes the guard, say at the point X (Figure 2), the cables are bent in as indicated in dotted lines. The free ends of the bracket 7 are bent into the positions shown in dotted lines, collapsing or coiling further about each other. Since the cables are free to slide longitudinally, they themselves take practically all the longitudinal stress. Therefore, the resultant pressure on the bracket is in the transverse direction indicated by the arrow Y. This transverse force is taken up by the coil spring action of the bracket.

Thus the novel bracket as illustrated in Figure 2, it will be noted, comprises a sheet of flat spring metal so shaped and coiled in plan that the extremities thereof overlap one another, the outer extremity remote from the post being notched to receive the guard rail cable and the inner extremity being in a position to coact with the cable positioned in the notched portion. The novel bracket thus absorbs transverse forces transmitted thereto by the cable guard rail element. The inwardly bent or flared ears 9a in effect provide bell-mouthed notches for the cables which increase the cable bearing area and thus minimize wear.

The invention is applicable to road guards of various other kinds. The guard rail may consist of the wire cable or rope illustrated in Figures 1, 2 and 3, or it may be made of flat strips, woven wire fabric, or other material. The transversely reacting spring bracket may also be made of various other materials than the flat spring metal illustrated and may be made in loops or other shapes, as square, elliptical, cylindrical, etc. So also the fastening means may be varied by the substitution of various types of clamps, clips, bolts or the like, for those above described.

With the above in mind, some of the various possible modifications of the invention are illustrated by the drawings and will now be described.

It might be mentioned at this point that the form of post is entirely immaterial. In Figures 1 through 3 the posts are illustrated as being made from rail sections. However, in the various modifications which are to be disclosed the posts are shown as being made of wood.

Figure 4:
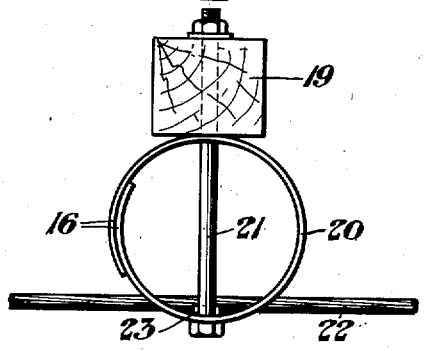
Figures 4 through 13 are views similar to that of Figure 2 but showing various possible modifications of the preferred form.

Figure 4 shows a post 19, a piece of flat metal 20 formed into a cylindrical loop with its respective ends overlapped at one side, as at 16, and a bolt 21 which passes completely through both sides of the loop formed by the piece 20. A wire rope 22 extends past this post 19, and the piece 20 is provided with a circumferential slot in which this rope 22 is retained by means of a pin 23 in much the same manner as was disclosed in the preferred form of the invention.

Figure 5:
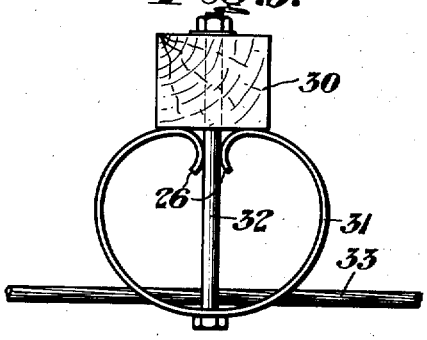

Figure 5 shows a post 30 to which a piece of flat metal 31 is circumferentially mounted by means of a bolt 32 that extends radially completely therethrough. The ends 26 of this piece 31 are turned inwardly and ride against the bolt 32. A wire rope 33 extends transversely past the post 30 and is passed through a slot in the piece 31 in the same manner as was the case in the modification illustrated by Figure 4.

Figure 6:
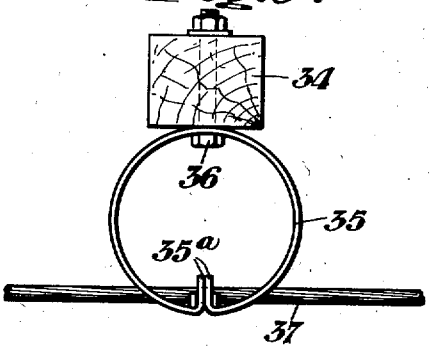

Figure 6 shows a post 34 to which a piece of flat metal 35 is fastened by means of a bolt 36. The ends of this piece 35 are turned inwardly and their respectively opposite faces placed in contact with each other inwardly, as at 35a. A wire rope 37 is mounted by this piece 35 in the same manner as in the case of the form shown by Figures 4 and 5.

Figure 7:
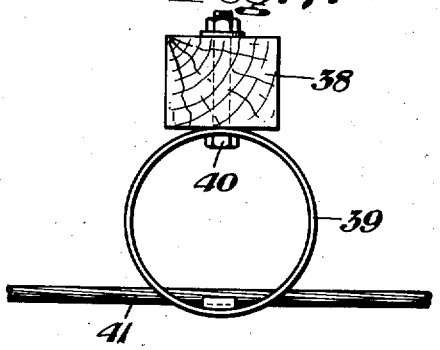

Figure 7 shows a post 38 which mounts an endless flat metal loop 39 by means of a bolt 40, and a wire rope 41 is mounted by this loop 39 in the same manner as in the case of Figures 4 and 5.

Figure 8:
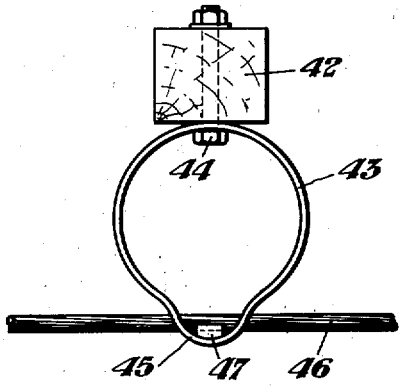

Figure 8 shows a post 42 to which an endless loop 43 of flat metal is fastened by means of a bolt 44. This loop is characterized in that it has a portion 45 that is opposite the pots 42 and which is sharply looped out from the rest. The portion 45 is slotted, and a wire rope 46 is passed through the slot and retained in position by means of a pin 47.

Figure 9:
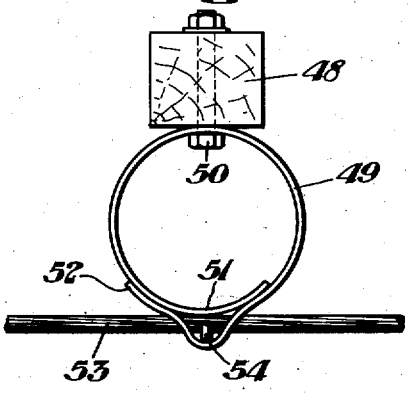

Figure 9 shows a post 48 to which a piece of flat metal 49 is transversely fastened by means of a bolt 50. The ends 51 and 52 of this piece are overlapped at a position opposite the post 48, and the outer end 52 is looped sharply outwardly and slotted, a wire rope 53 being passed through the slot and retained in position by means of a pin 54.

Figure 10:
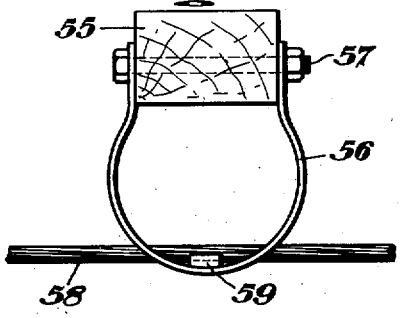

In Figure 10 a new form of the invention is encountered. In this a post 55 has a loop of flat metal 56 fastened transversely to it, the ends of this piece 56 being arranged on either of the sides of the post 55 and there fastened by means of a bolt 57. This piece 56 is appropriately slotted so as to mount a wire rope 58 that is retained in position by means of a pin 59.

Figure 11:
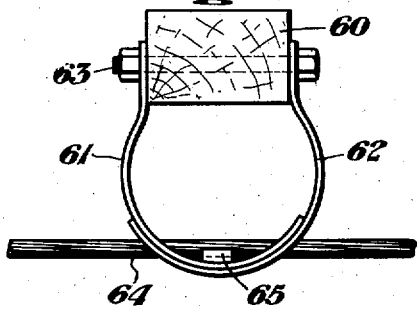

Figure 11 illustrates a modification that is much like that described above. Either side of a post 60 mounts two pieces of flat metal 61 and 62 which cooperate to form a loop and which are respectively fastened to the sides of the post 60 by means of a single bolt 63. The respective ends of these pieces 61 and 62 overlap and are slotted, a wire rope 64 being retained in the slot by means of a pin 65.

Figure 12:
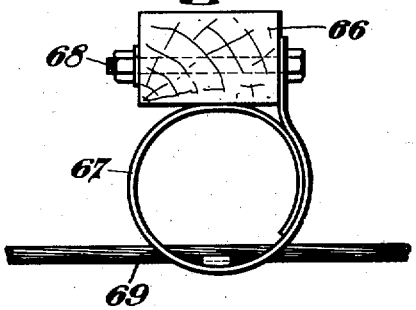

Figure 12 shows a post 66 to one side of which a piece of flat metal 67 is fastened by means of a bolt 68. This piece is curled around to form a cylindrical loop that contacts the front of the post 66, the portion of this piece opposite the post 66 being slotted so as to mount a wire rope 69 in the same manner as has been described.

Figure 13:
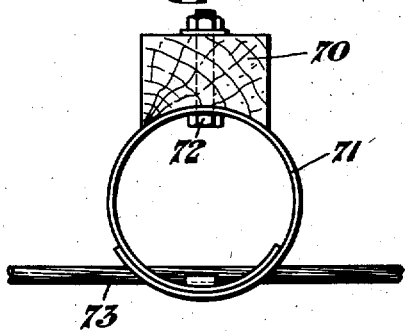

In Figure 13 a post 70 is characterized by having its front face curved, and a piece of flat metal 71 is bent into the form of a cylindrical loop and fastened transversely to this curved face by means of a bolt 72. A wire rope 73 is mounted by this piece 71 in the same manner as has been described in connection with the modification illustrated by Figure 11.

I claim:

1. A road guard including the combination of a post, a flat metal spring mounted by the post and having an outwardly curved portion spaced from the post and at least one circumferentially extending slot in the portion opposite said post, a strand extending through said slot, and means for retaining said strand therein with freedom for movement in the direction of its length.

2. A road guard including the combination of a post, a flat spring metal loop transversely mounted by said post and having at least one circumferentially extending slot in its portion opposite said post, a strand extending transversely past said post and arranged in said slot, and a pin arranged between said strand and the inside of said loop.

3. A road guard including the combination of an upstanding post, a piece of flat spring metal formed into a loop with its ends in overlapped relationship, the outer one of said ends having at least one circumferentially extending slot formed therein, means for fastening said loop transversely to said post with said ends opposite the latter, at least one strand extending transversely past said post and arranged in said slot so as to bear against the inner one of said ends and a pin passed between said strand and the inside of the outer one of said ends.

4. In a traffic guard for highways, in combination, a rigid post or support, a plurality of vertically spaced substantially parallel cables, and a tubular bracket of resilient sheet metal rigidly secured to the post and having cable receiving notches formed therein at points remote from the post, means being provided for confining the cables in said notches respectively.

5. In a traffic guard for highways, a plurality of vertically spaced substantially parallel cables and carrying means therefor comprising a plurality of horizontally spaced supports, each such support including a base member rigidly anchored to the ground, and a bracket secured to the base member and projecting laterally therefrom, the bracket having a plurality of rope receiving notches formed therein remote from the base member, means for retaining the ropes in said notches, said bracket being resilient, so as to be horizontally deflectable.

6. In a highway guard, a support, a tubular member of sheet metal, rigid axially, and transversely flexible, said member having a portion secured to said post and a second portion diametrically opposite said first portion which is provided with elongated horizontally extending cable receiving notches, and spaced parallel cables having intermediate portions secured within said notches.

7. In a highway guard, a support, a tubular member of sheet metal having axially extending free edges, the marginal portions of said member adjacent said edges contacting and overlapping, said overlapping portions being provided respectively with elongated registering cable receiving notches, cables having portions positioned within said notches, and means securing said member to said support.

8. In a traffic guard for highways, a plurality of vertically spaced substantially parallel cables and carrying means therefor comprising a plurality of supports spaced to one side of said cables and anchored to the ground and brackets intermediate said supports and cables, each bracket comprising a horizontally curved flexible metallic member having one portion attached to a support and a portion remote from said support provided with spaced cable receiving notches, intermediate portions of said cables being positioned within said notches and protected by adjacent portions of the brackets from contact with vehicles.

9. In a traffic guard for highways, a plur lity of vertically spaced substantially parallel cables and carrying means therefor comprising a plurality of supports spaced to one side of said cables and anchored to the ground, and brackets intermediate said supports and cables, each bracket comprising a flexible metallic sheet having one portion secured to a support and a second portion spaced from the support, said second portion having a smooth outer convex surface and being provided with spaced horizontally extending elongated notches for the reception of intermediate portions of said cables, such intermediate portions of the cables being protected by adjacent portions of the bracket from contact with vehicles.

10. In a traffic guard for highways, in combination, a rigid post or support, a bracket of sheet metal curved in a horizontal plane so as to be horizontally flexible under the influence of horizontally applied forces, said bracket being vertically rigid and having an aperture formed in one portion thereof for the reception of a horizontally disposed cable, means securing a portion of the bracket remote from said aperture to the support, a horizontally disposed cable having an intermediate portion within said aperture, and means for retaining the cable within said aperture.

11. The combination set forth in claim 10, in which the cable retaining means comprises a member formed separately from the bracket and which loosely engages the cable so as to permit longitudinal movement of the cable relatively to the bracket.

12. A road guard including the combination of a post, a flat spring metal loop mounted by said post and having at least one circumferentially extending slot in its portion opposite said post, a guard rail element extending past said post and arranged in said slot and a retaining member arranged between said element and the inside of said loop.

13. A resilient bracket for yieldingly mounting a guard rail element, said bracket comprising a sheet of spring metal so coiled in plan and so constructed and arranged that the extremities thereof overlap and are free to move with relation to one another under impact, the bracket having a seat portion adapted to be secured to a supporting post, the outer free extremity remote from the seat portion being notched to receive a guard rail element and the said inner free extremity being disposed opposite said notched portion so as to be in position for coaction with the said guard rail element.

14. A resilient bracket for yieldingly mounting a guard rail cable, said bracket comprising a sheet of spring metal so coiled in plan that the extremities thereof overlap and are free to move with relation to one another under impact of a vehicle with the cable, the bracket having a seat portion adapted to be secured to a supporting post, the outer free extremity remote from the seat portion being notched to receive a guard cable and the said inner free extremity being disposed opposite said notched portion so as to be in a position for coaction with said guard cable, there being associated with the notched portions bent extensions forming increased bearing surfaces for the guard cable.

15. A road guard bracket comprising a sheet of flat spring metal so shaped and coiled in plan that the extremities thereof overlap one another with a space between them, the outer extremity of the bracket being notched to receive a guard rail element and there being associated with the notched portion bent extensions forming increased bearing surfaces for the guard rail element.

16. A road guard bracket comprising a sheet of spring metal so shaped and coiled in plan that the extremities thereof overlap and frictionally engage one another, the outer extremity of the bracket being notched to receive a guard rail element and forming a curved nose portion on the road side face of the bracket in a plane beyond the road side face of said guard rail element so as to protect said element in the zone where it engages the bracket.

CARL C. AHLES.